United States Patent
Cho

(10) Patent No.: US 7,336,881 B2
(45) Date of Patent: Feb. 26, 2008

(54) PLANAR LIGHTWAVE CIRCUIT AND FABRICATION METHOD THEREOF

(75) Inventor: Jae-Geol Cho, Suwon-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 46 days.

(21) Appl. No.: 11/250,234

(22) Filed: Oct. 14, 2005

(65) Prior Publication Data

US 2006/0104585 A1  May 18, 2006

(30) Foreign Application Priority Data

Nov. 16, 2004  (KR) .................. 10-2004-0093724

(51) Int. Cl.
*G02B 6/122* (2006.01)

(52) U.S. Cl. ........................................ 385/129; 385/14

(58) Field of Classification Search ............... None
See application file for complete search history.

(56) References Cited

U.S. PATENT DOCUMENTS

| | | | | |
|---|---|---|---|---|
| 5,064,266 A | * | 11/1991 | Sun et al. ................ | 385/132 |
| 5,408,569 A | * | 4/1995 | Nishimoto ............... | 385/132 |
| 5,439,782 A | * | 8/1995 | Haemmerle et al. ..... | 430/321 |
| 5,480,764 A | * | 1/1996 | Gal et al. ................ | 430/321 |
| 5,546,480 A | * | 8/1996 | Leonard .................. | 385/3 |
| 5,846,694 A | * | 12/1998 | Strand et al. ............ | 430/321 |
| 6,778,737 B2 | * | 8/2004 | Shimoda .................. | 385/43 |
| 2004/0218889 A1 | * | 11/2004 | Shelnut et al. .......... | 385/143 |

* cited by examiner

*Primary Examiner*—Rodney Bovernick
*Assistant Examiner*—Mike Stahl
(74) *Attorney, Agent, or Firm*—Cha & Reiter, LLC

(57) ABSTRACT

A method of fabricating a planar lightwave circuit (PLC) having an optical waveguide includes the steps of: (b) forming an initial optical waveguide having a predetermined pattern, which is a transmission medium of light, on a substrate; and (c) reflowing the optical waveguide by applying heat thereto.

16 Claims, 7 Drawing Sheets

PLANAR LIGHTWAVE CIRCUIT AND FABRICATION METHOD THEREOF

CLAIM OF PRIORITY

This application claims priority under 35 U.S.C. § 119 to an application entitled "Planar Lightwave Circuit and Fabrication Method thereof," filed in the Korean Intellectual Property Office on Nov. 16, 2004 and assigned Serial No. 2004-93724, the contents of which are incorporated herein by reference.

BACKGROUND OF THE INVENTION

1. Field of the Invention

The present invention relates generally to a method of fabricating an optical waveguide device and in particular, to a method of forming a waveguide included in an integrated optical circuit or a planar lightwave circuit (PLC) used in an optical communication system.

2. Description of the Related Art

An integrated optical circuit typically includes a linear or curve shaped optical waveguide, which is designed to propagate light from one point to another or filter the light by controlling the wavelength characteristic of the light, a mirror, and a lens. The optical waveguide for controlling a refractive index to silica ($SiO_2$) and obtained by adding dopants, such as $GeO_2$, $P_2O_5$ and $B_2O_3$, is popularly used for fabricating the integrated optical circuit.

In attempts to increase the efficiency of an optical communication system and lower the system costs, it is very important to decrease coupling losses between the optical waveguide and a laser, and between the optical waveguide and an optical fiber in the integrated optical circuit. Various methods to reduce these coupling losses have been suggested. In particular, for a typical single mode optical fiber, since a difference between the indices of refraction of a core and a cladding is fixed to 0.3%, if a high refractive index material is used for fabricating the optical waveguide to reduce the size of the integrated optical circuit, the coupling loss largely increases due to a mode discord between the optical fiber and the optical waveguide. Thus, for fabricating a highly integrated optical device, it is a very important to improve the coupling loss.

For a planar hybrid integration device, it is very important to minimize a coupling loss between a planar hybrid integration device and an optical fiber, and a coupling loss between each unit device and an optical waveguide.

Currently, the most efficient technique to decrease a coupling loss between an optical device and an optical fiber among techniques utilizes an optical mode converter. A mode size of an optical waveguide is similar to a mode size of an optical fiber by changing a cross section of the optical waveguide in a horizontal direction and/or in vertical direction of the substrate of an integrated optical device. A change in a cross section size of the optical waveguide in the horizontal direction of the substrate, i.e., a lateral taper side of the optical waveguide, can be easily obtained by controlling a width of a slit on an etching mask generally used for an optical waveguide fabricating process. However, a change in a cross section size of the optical waveguide in the vertical direction of the substrate, i.e., a vertical taper side of the optical waveguide, requires a more complicated process.

FIG. 1 is a conceptual diagram of an apparatus for forming a planar lightwave circuit (PLC) 110 having a thermally expanded core according to a prior art.

As shown, the apparatus includes a heater 120 and a holder 130. The PLC 110 includes a core 112 and a cladding 114, which are made from silica and dopants. A first edge of the PLC 110 is fixed to the holder 130, and a second edge is inserted into the heater 120 for thermal diffusion. The dopants are diffused from the core 112 to the cladding 114 by heat provided by the heater 120. Accordingly, the size of a cross section of a heated portion of the core 112 is actually expanded.

The heater 120 induces diffusion of the dopants in the core 112 by heating the second edge of the PLC 110.

The holder 130 fixes the PLC 110 by clamping the first edge of the PLC 110.

That is, the dopants are diffused from the core 112 to the cladding 114 by the heat applied from the heater 120, and as a result, the size of a cross section of the heated portion of the core 112 increases. Accordingly, a mode of the core 112 is matched to a mode of an external optical fiber.

The method of fabricating the PLC110 using the heat diffusion described above is known as a chip unit process, and not a wafer unit process, due to heated characteristics of the fabricated PLC 110. Thus, much time and efforts are required for the fabricating using the above process. In addition, since the length of an optical mode converter is very long, about 4 mm, due to a temperature gradient according to the heat diffusion, it is very difficult to implement the above fabricating method.

FIGS. 2 to 4 are sectional diagrams illustrating a method of fabricating a three-dimensionally tapered optical waveguide according to a prior art. The fabricating method indicates a gray scale lithography scheme generally used in the present.

The fabricating method includes the steps of (a) to (c) described below.

Referring to FIG. 2, the step (a) is a process of sequentially layering a silica layer 22 and a photoresist layer 23 on a substrate 21 and deploying a gray scale mask 24 on the photoresist layer 23.

To form the silica layer 22 on the substrate 21, a chemical vapor deposition (CVD) process and a flame hydrolysis deposition (FHD) process may be used, wherein the CVD can be classified into plasma enhanced chemical vapor deposition (PECVD) and low pressure chemical vapor deposition (LPCVD). The photoresist layer 23 can be formed on the silica layer 22 with a predetermined thickness by dropping liquid photoresist on the silica layer 22 and rotating the substrate 21 at a high speed.

The gray scale mask 24, which is deployed on the photoresist layer 23 and fabricated to have different permeability of ultraviolet rays in a horizontal direction, may be a glass material.

Referring to FIG. 3, the step (b) is a process of forming a photoresist mask 33 by photolithographing the photoresist layer 23 using the gray scale mask 24. That is, the photoresist mask 33 is formed through a photo-exposing and developing process using ultraviolet rays. A height of the photoresist mask 33 remaining through the photo-exposing and developing process is changed along the horizontal direction by changing the intensity of the ultraviolet beam radiated on the photoresist layer 23 in the horizontal direction using the gray scale mask 24.

Referring to FIG. 4, the step (c) is a process of forming a three-dimensionally tapered optical waveguide by etching the silica layer 22 using the photoresist mask 33. That is, a vertical profile along the horizontal direction of the photoresist mask 33 is transferred to the silica layer 22 by etching the silica layer 22 using the photoresist mask 33. Accordingly, the three-dimensionally tapered optical waveguide 42 is formed. The gray scale lithography scheme is popularly used for fabricating having three-dimensionally tapered cores and micro lenses.

FIG. 5 is a picture obtained by photographing an example of a three-dimensionally tapered optical waveguide, which is formed by the above-described fabricating method.

However, the biggest drawback of the gray scale lithography scheme is that it is not easy to control the process due to various factors. According to the experimental data in the ultraviolet rays photo-exposing and developing process using the gray scale mask 24, the gray scale lithography scheme is very sensitive to uniformity of a photoresist, air temperature and humidity, temperature of developer, and intensity and time of the ultraviolet rays in the photo-exposing process. Accordingly, the operation control is not easy, and reproducibility is low. In addition, since the gray scale mask 24 is more expensive than a general etching mask, additional expenses are required.

SUMMARY OF THE INVENTION

An object of the present invention is to substantially solve at least the above problems and/or disadvantages and provide additional advantages, by providing a planar lightwave circuit (PLC) having a simpler process, an easier control, a lower loss, and higher reproducibility comparing to a prior art, and a fabricating method thereof.

According to one aspect of the present invention, there is provided a method of fabricating a planar lightwave circuit (PLC) having an optical waveguide which is a transmission medium of light, the method comprising the steps of: (b) forming an initial optical waveguide having a predetermined pattern, which is a transmission medium of light, on a substrate; and (c) reflowing the optical waveguide by applying heat thereto.

According to another aspect of the present invention, there is provided a planar lightwave circuit (PLC) having an optical waveguide which is a transmission medium of light, the PLC comprising: a substrate; and an optical waveguide, which is formed on the substrate, has a predetermined pattern, and is a transmission medium of light, wherein the optical waveguide has a convexly projected shape by being reflown by heat wherein the optical waveguide has a convexly projected shape by being reflown by heat.

BRIEF DESCRIPTION OF THE DRAWINGS

The above features and advantages of the present invention will become more apparent from the following detailed description when taken in conjunction with the accompanying drawings in which.

DETAILED DESCRIPTION

Figure 1:
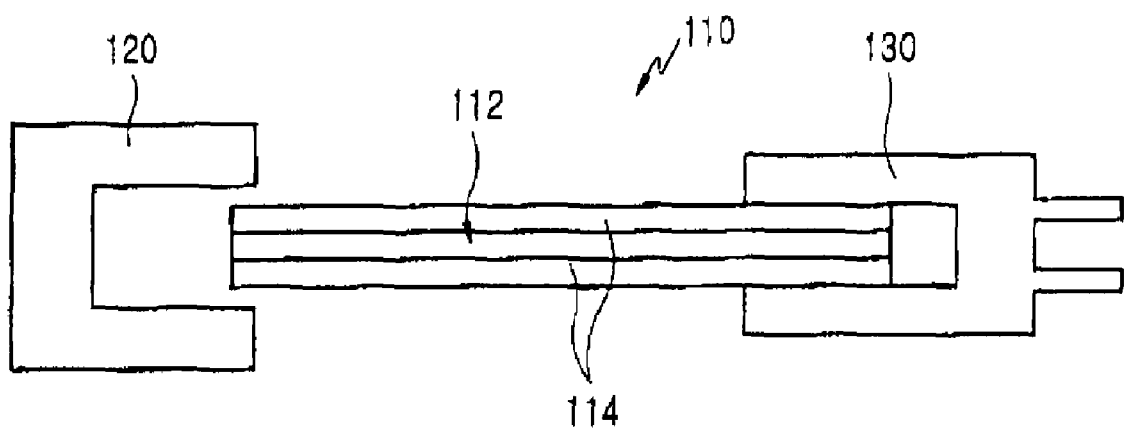
FIG. 1 is a conceptual diagram of an apparatus for forming a planar lightwave circuit (PLC) having a thermally expanded core according to a prior art.
Figure 2:
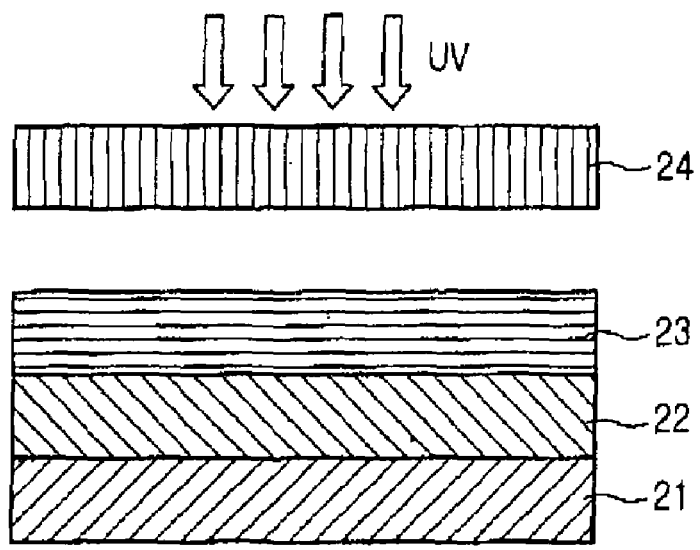
FIGS. 2 to 4 are sectional diagrams illustrating a method of fabricating a three-dimensionally tapered optical waveguide according to a prior art.
Figure 3:
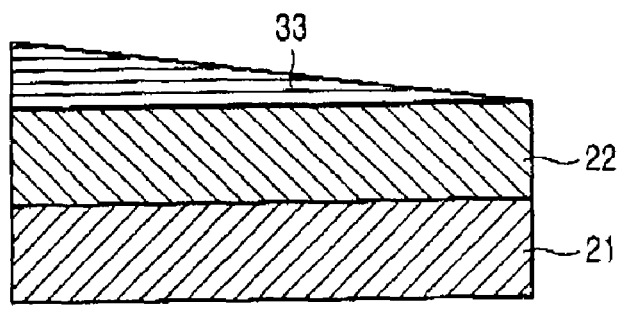
Figure 4:
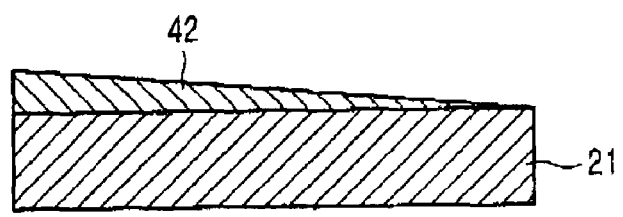
Figure 5:
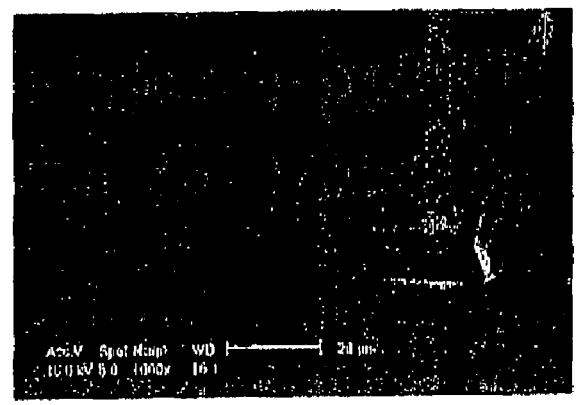
FIG. 5 is a picture obtained by photographing an example of a three-dimensionally tapered optical waveguide, which is formed by the fabricating method.

Now, embodiments of the present invention will be described herein below with reference to the accompanying drawings. In the drawings, the same or similar elements are denoted by the same reference numerals even though they are depicted in different drawings. For the purposes of clarity and simplicity, well-known functions or constructions are not described in detail as they would obscure the invention in unnecessary detail.

Figure 6:
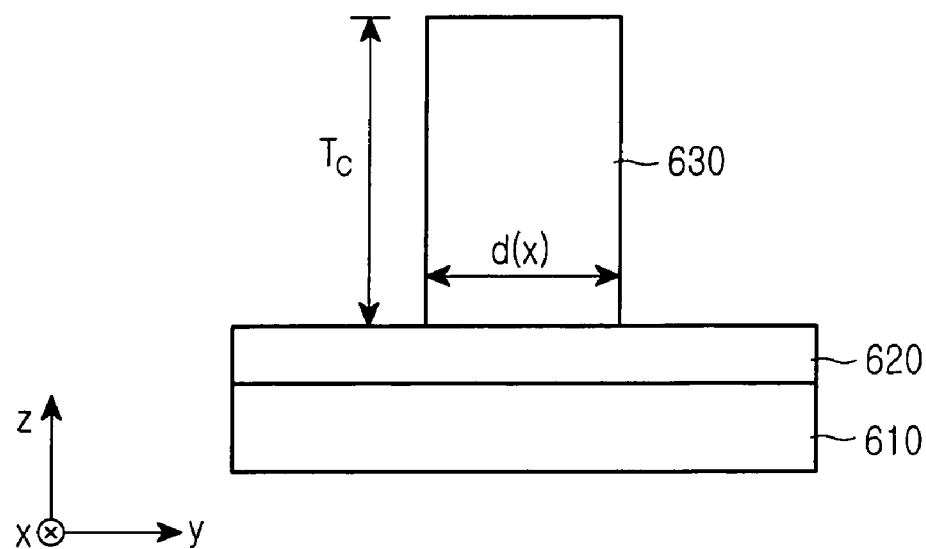
FIGS. 6 to 8 are sectional diagrams illustrating a method of fabricating a PLC according to an embodiment of the present invention.
Figure 7:
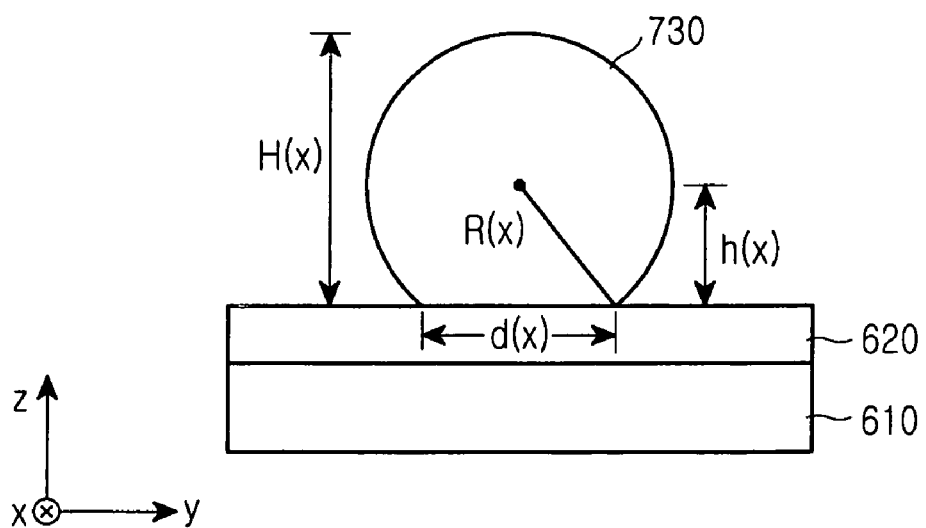
Figure 8:
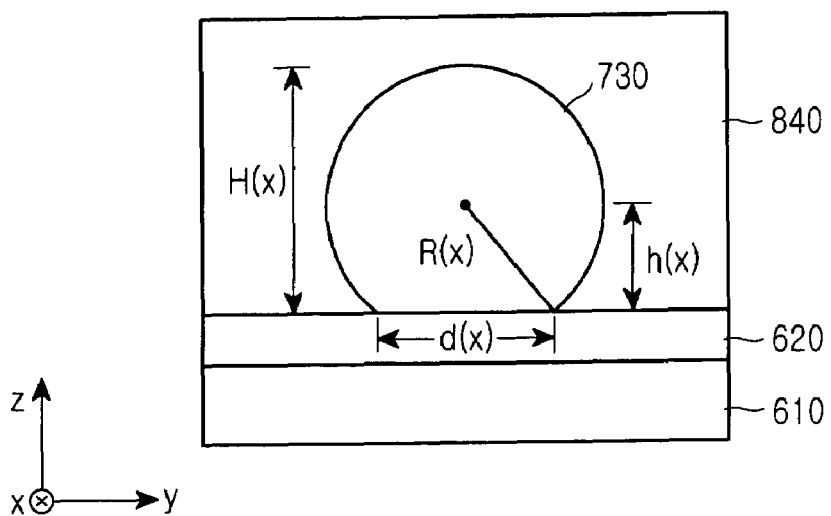

FIGS. 6 to 8 are sectional diagrams illustrating operation steps (a) to (d) of fabricating a PLC according to an embodiment of the present invention.

Referring to FIG. 6, the step (a) involves a process of layering a lower cladding 620 on a substrate 610. The substrate 610 is made from silicon, and the lower cladding 620 is made from silica ($SiO_2$). The lower cladding 620 may include dopants such as $GeO_2$, $P_2O_5$ and $B_2O_3$ to control a refractive index and may be formed via a flame hydrolysis deposition (FHD) process.

The step (b) involves a process of layering an initial optical waveguide 630 serving as a transmission medium of light having a predetermined pattern on the lower cladding 620. The initial optical waveguide 630 can be formed by the FHD process and a photolithography process. The lower cladding 620 has a lower refractive index than the initial optical waveguide 630 in order to lock the light in the initial optical waveguide 630. The substrate 610 itself can play a role of the lower cladding 620 in a case where the substrate 610 is made from quartz, in which case the step (a) for forming the lower cladding 620 can be omitted. The step (b) will now be described in detail hereinafter.

The initial optical waveguide 630 having the predetermined pattern is formed by forming a core layer on the lower cladding 620 and by photo-lithographing the core layer using a mask having a predetermined pattern of slits and a photoresist. In the present embodiment, for the initial optical waveguide 630 whose cross section has a rectangular shape, a width (a y-axis direction) and a height (a z-axis direction) can be fixed along its lengthwise direction (an x-axis direction). Note that the width can be continuously changed with the fixed height along the length direction. Before performing the next step (c), which is a heat reflowing process, the initial optical waveguide 630 has a lower width d(x) on the bottom portion and a height $T_c$ along the length direction. Herein, the x-axis direction, which indicates the length direction of the initial optical waveguide 630, represents a direction perpendicular to the sheet in FIG. 6. The initial optical waveguide 630 is made from silica ($SiO_2$) doped with dopants, which can be at least one of $GeO_2$, $P_2O_5$, $B_2O_3$, $TiO_2$ and $Al_2O_3$.

Referring to FIG. 7, the step (c) involves a process of reflowing the initial optical waveguide 630 by applying heat thereto. That is, if heat with a high temperature is applied to the initial optical waveguide 630, the state of the initial optical waveguide 630 is changed from a solid state to a liquid state, and a viscous flow occurs. Thus, the initial optical waveguide 630 is reflown due to the fluidity of fluid. Thus, the cross section of the initial optical waveguide 630 is changed to a generally convex shape, i.e., a shape projected convexly (or roundly) from the surface of the lower cladding 620, due to a surface tension. During this transition stage, a segment of cross section of the circular shape is cut off, thus the shape of the cross section obtained by reflowing the fluid on the lower cladding 620 is not a perfect circle. The cross section has a shape in which a portion of the circle is cut off by one chord (the length of the chord is d(x) in FIG. 7). Herein, the height $T_c$ and lower width d(x) of the initial optical waveguide 630 is controlled so that the length of the chord d(x) is less than a diameter 2R(x) of the cross section of the changed optical waveguide 730. In general, the greater the content of the dopants doped on the initial optical waveguide 630 is, the lower the temperature at which the reflow begins is. Thus, since the content of the dopants of the initial optical waveguide 630 is greater than that of the lower cladding 620 or the dopants are doped on only the initial optical waveguide 630, if heat with an appropriate temperature is used, the reflow phenomenon is limited to only the initial optical waveguide 630.

The changed optical waveguide 730 has a radius R(x) along the length direction and a height h(x) from the surface of the lower cladding 620 to the center of curvature. A height H(x) of the changed optical waveguide 730 is obtained by changing the height $T_c$ of the initial optical waveguide 630 using the reflow. The lower width d(x) of the changed optical waveguide 730 is equal to that of the initial optical waveguide 630. That is, the lower width d(x) is not changed before and after the reflowing process.

If the cross section of the initial optical waveguide 630 has a constant lower width d(x) and height $T_c$ along the lengthwise direction, the cross section of the changed optical waveguide 730 has the constant radius R(x) and height H(x) along the lengthwise direction. On the contrary, if the height $T_c$ of the initial optical waveguide 630 is constant and the lower width d(x) varies, both the radius R(x) and height h(x) of the changed optical waveguide 730 varies along the lengthwise direction. Accordingly, if the lower width d(x) of the initial optical waveguide 630 continuously varies in the same manner along the length direction, both the radius R(x) and height h(x) of the changed optical waveguide 730 continuously varies in the same manner along the lengthwise direction. As a result, a three-dimensionally tapered optical waveguide can be fabricated. A change of the cross section of the changed optical waveguide 730 can be analyzed according to the following equations.

A correlation of Equation 1 is given among the radius R(x), the height of the center of curvature h(x) and lower width d(x) of the changed optical waveguide 730 according to geometric conditions, wherein the variable x denotes a coordinates value of the changed optical waveguide 730 in the lengthwise direction.

$$h(x) = \sqrt{R(x)^2 - \frac{d(x)^2}{4}} \quad (1)$$

If the width and height of an optical waveguide is negligible compared to the length of the optical waveguide, it can be assumed that the optical waveguide is infinitely long and the cross sectional area of the optical waveguide is equal before and after a reflowing process. An assumption that the cross sectional area of the initial optical waveguide 630 is equal to the cross sectional area of the changed optical waveguide 730 after the reflowing process at a given location x is that when a minute volume of the initial optical waveguide 630, i.e., the cross sectional area*d(x), is a control volume, a sum of inflow mass and outflow mass in the x-axis direction, i.e., a net mass transfer, is 0.

If the cross sectional area of the initial optical waveguide 630 is rapidly changed, that is, if it is assumed that the initial optical waveguide 630 is short, it needs to be considered that another reflow pattern is also formed at the edge of the initial optical waveguide 630 due to the surface tension. In other words, the edge of the changed optical waveguide 730 becomes a spherical shape not a planar shape. This means that the net mass transfer from the control volume in the x-axis direction is not 0. Accordingly, in this case, the mass conservation law does not work. For example, considering an order of magnitude in fabrication of a mode converter, in general, the length of an optical waveguide is hundreds mm, whereas a width and a height of the optical waveguide are several mm. In addition, since a taper angle of the mode converter is very small (because the taper angle cannot be large due to an optical loss), a cross sectional area at each edge of the mode converter is very small. Accordingly, an order of change due to the reflow is also negligible. Thus, it can be assumed that the net mass transfer at each edge in the x-axis direction is 0. If it is assumed that the net mass transfer at each edge of the mode converter is 0, it can be assumed that the net mass transfer at the control volume in the mode converter is 0.

If it is assumed that the mass conservation law works between the cross sectional area of the initial optical waveguide 630 and the cross sectional area of the changed optical waveguide 730, Equation 2 is obtained.

$$d(x)T_c = \pi R(x)^2 - \left(\frac{1}{2}R(x)^2 \cos^{-1}\left(\frac{h(x)}{R(x)}\right) - \frac{1}{2}d(x)h(x)\right) \quad (2)$$

Herein, $d(x)T_c$ denotes the cross sectional area of the initial optical waveguide 630, $\pi R(x)^2$ denotes the area of a circle whose radius is R(x), $0.5R(x)^2 \cos^{-1}(h(x)/R(x))$ denotes the area of a sector whose central angle is $\cos^{-1}(h(x)/R(x))$, and 0.5d(x)h(x) denotes the area of a triangle whose base and height are d(x) and h(x), respectively. That is, the cross sectional area $d(x)T_c$ of the initial optical waveguide 630 before the reflowing process is equal to the cross sectional area of the changed optical waveguide 730 obtained by subtracting the area of a small circular piece cut by the chord whose length is d(x), i.e., $\{0.5R(x)^2 \cos^{-1}(h(x)/R(x))-0.5d(x)h(x)\}$, from the area of the circle whose radius is R(x), i.e., $\pi R(x)^2$. Herein, the small circular piece means a relatively smaller circular piece among two circular pieces obtained by cutting a circle by a chord.

The variables R(x) and h(x) can be obtained by solving combined Equations 1 and 2. That is, Equation 3 containing R(x) instead of h(x) can be obtained by substituting Equation 1 in Equation 2.

$$R(x)^2\left(\pi - \cos^{-1}\left(\frac{\sqrt{R(x)^2 - \frac{d(x)^2}{4}}}{R(x)}\right)\right) + \frac{d(x)\sqrt{R(x)^2 - \frac{d(x)^2}{4}}}{2} - d(x)T_c = 0 \quad (3)$$

The value R(x) can be obtained in response to given d(x) and $T_c$ by applying a numerical analysis method based on repeated computations such as a bi-section method to Equation 3.

To form a three-dimensionally tapered optical waveguide in which the height and lower width vary, the same pattern of reflow should be generated for each lower width d(x) according to a change in the lower width d(x) of the optical waveguide under the same heat treatment condition, meaning that Equations 1 to 3 can be applied within a range of the lower width d(x) required for fabricating the three-dimensionally tapered optical waveguide.

Referring to FIG. 8, the step (d) involves a process of forming an upper cladding 840 on the changed optical waveguide 730. The upper cladding 840, which has the same refractive index as the lower cladding 620, can be formed by the FHD process. The upper cladding 840 encloses the changed optical waveguide 730, locking light within changed optical waveguide 730 by fully enclosing the changed optical waveguide 730 with the lower cladding 620 together.

Figure 9:
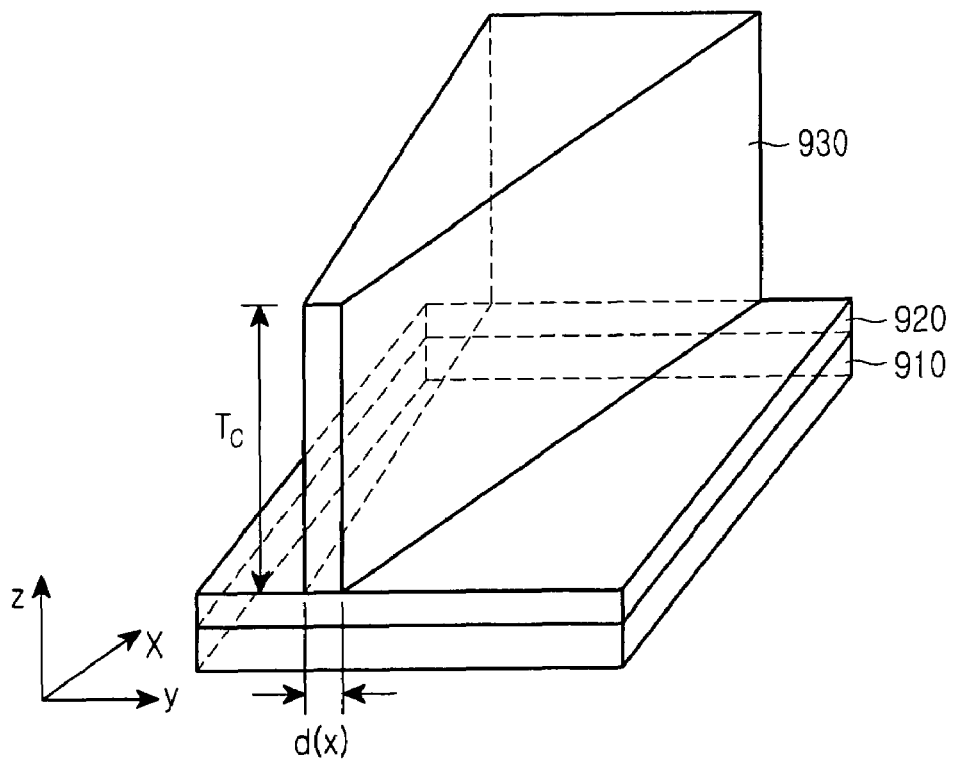
FIGS. 9 and 10 are perspective diagrams illustrating a method of fabricating a three-dimensionally tapered optical waveguide according to an embodiment of the present invention.
Figure 10:
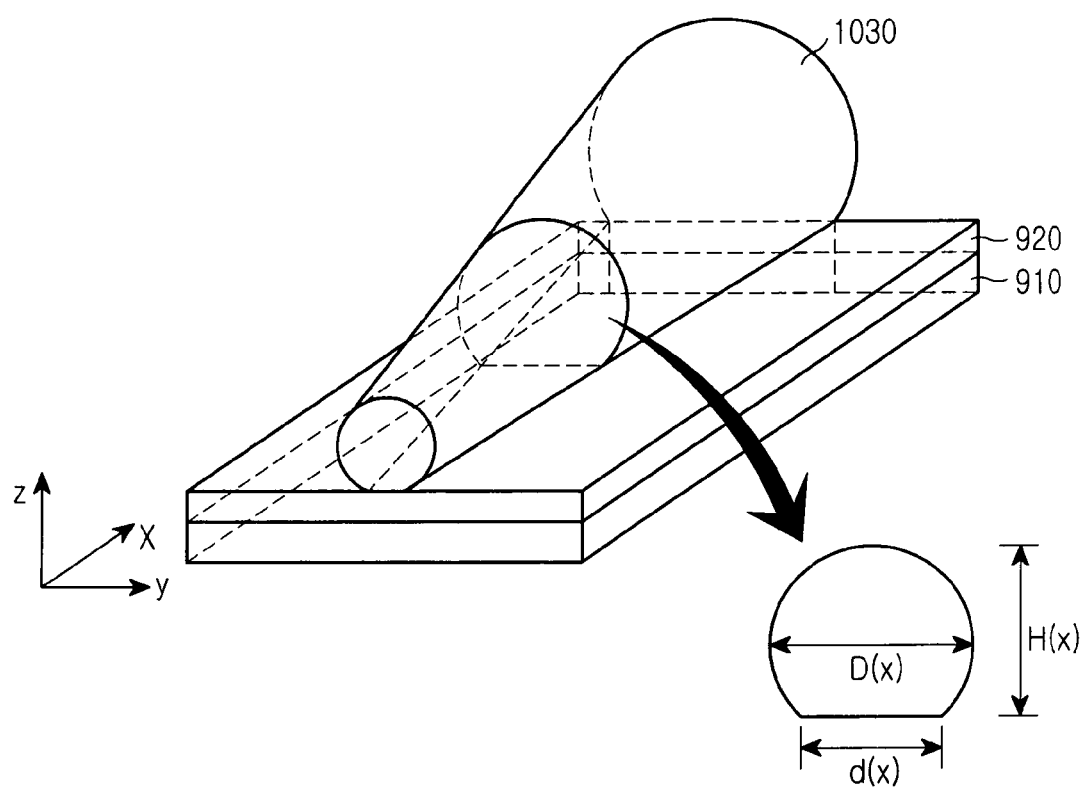

FIGS. 9 and 10 are perspective diagrams illustrating a method of fabricating a three-dimensionally tapered optical waveguide according to another embodiment of the present invention.

Referring to FIG. 9, an initial optical waveguide 930, which has a rectangular cross section, a constant height $T_c$ along the lengthwise direction (the x-axis direction), and a lower width d(x) continuously varying in the lengthwise direction, is formed on a substrate 910 and a lower cladding 920. The initial optical waveguide 930 has the lower width d(x) continuously increasing according to an increase of the x value (that is, according to proceeding from a front end to a rear end) with the least lower width d(0) at the front end position (that is, x=0). The lower width d(x) can be controlled by controlling widths of the slits of an etching mask during a process of forming the initial optical waveguide 930 through the photolithography process, and various shaped initial optical waveguides can be formed according to shapes of the slits.

Referring to FIG. 10, the initial optical waveguide 930 is reflown by applying heat thereto. A change of a cross section of an optical waveguide 1030 changed due to the heat is equivalent to the change of the cross section of the changed optical waveguide 730 shown in FIG. 7. That is, a height h(x) of a center of curvature and a radius R(x) of the changed optical waveguide 1030 has correlations shown in Equations 1 to 3 due to the change of the lower width d(x) of the initial optical waveguide 930, and after the reflowing process due to the heat application, a cross section of the initial optical waveguide 930 is changed to an generally convex shape, i.e., a shape projected convexly (or roundly) from the surface of the lower cladding 920. In geometrical, the cross section is changed to a shape in which a circular arc is cut off from a circle (that is, a segment of the circle). Even if the height $T_c$ of the initial optical waveguide 930 is maintained constant, the changed optical waveguide 1030 has a three-dimensional taper shape with a height H(x) and a diameter D(x) continuously varying in the length direction along the change of the lower width d(x).

FIGS. 11A to 11E are pictures illustrating examples of a changed optical waveguide and, in particular to a cross section of the changed optical waveguide along the lower width of an initial optical waveguide.

Figure 11A:
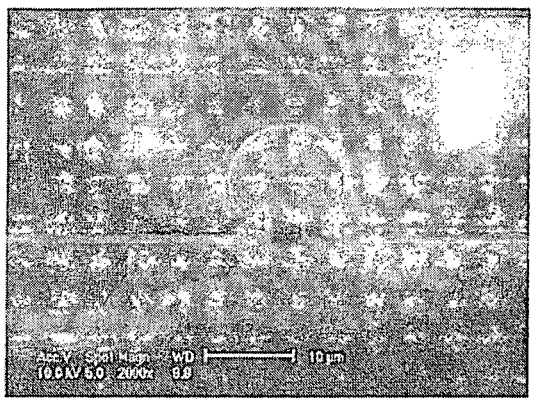
FIGS. 11A to 11E are pictures illustrating examples of a changed optical waveguide.
Figure 11B:
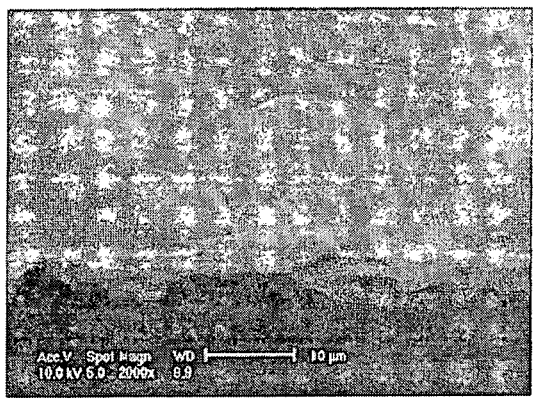
Figure 11C:
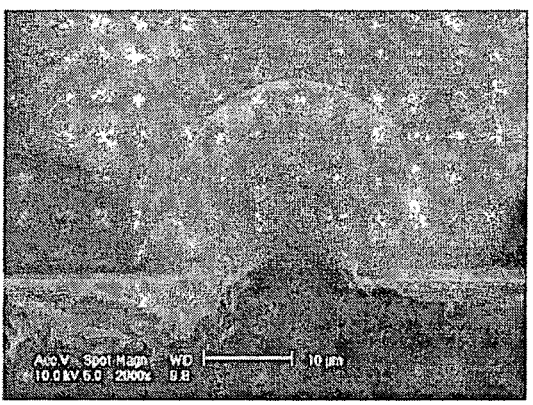
Figure 11D:
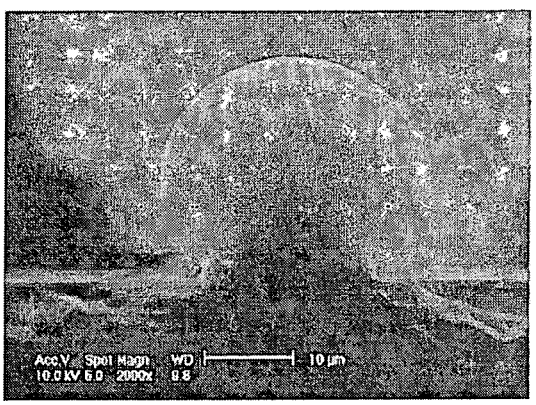
Figure 11E:

FIG. 11A shows the cross section of the changed optical waveguide when the lower width of the initial optical waveguide is 5 μm, FIG. 11B shows the cross section of the changed optical waveguide when the lower width of the initial optical waveguide is 10 μm, FIG. 11C shows the cross section of the changed optical waveguide when the lower width of the initial optical waveguide is 15 μm, FIG. 11D shows the cross section of the changed optical waveguide when the lower width of the initial optical waveguide is 20 μm, and FIG. 11E shows the cross section of the changed optical waveguide when the lower width of the initial optical waveguide is 25 μm.

In each case shown in FIGS. 11A to 11E, the initial optical waveguide is a linear type having a rectangular cross section with a constant 25 μm height. The cross section of the initial optical waveguide is changed by the reflowing process of heating at 900° C. for 10 hours. The cross sections of the changed optical waveguide are photographed using a scanning electron microscope. As shown in FIGS. 11A to 11E, even if the height of the initial optical waveguide before the reflowing process is constant, the height of the changed optical waveguide varies if the lower width varies. Hence, the height of the changed optical waveguide can be controlled by changing the lower width of the initial optical waveguide.

Figure 12:
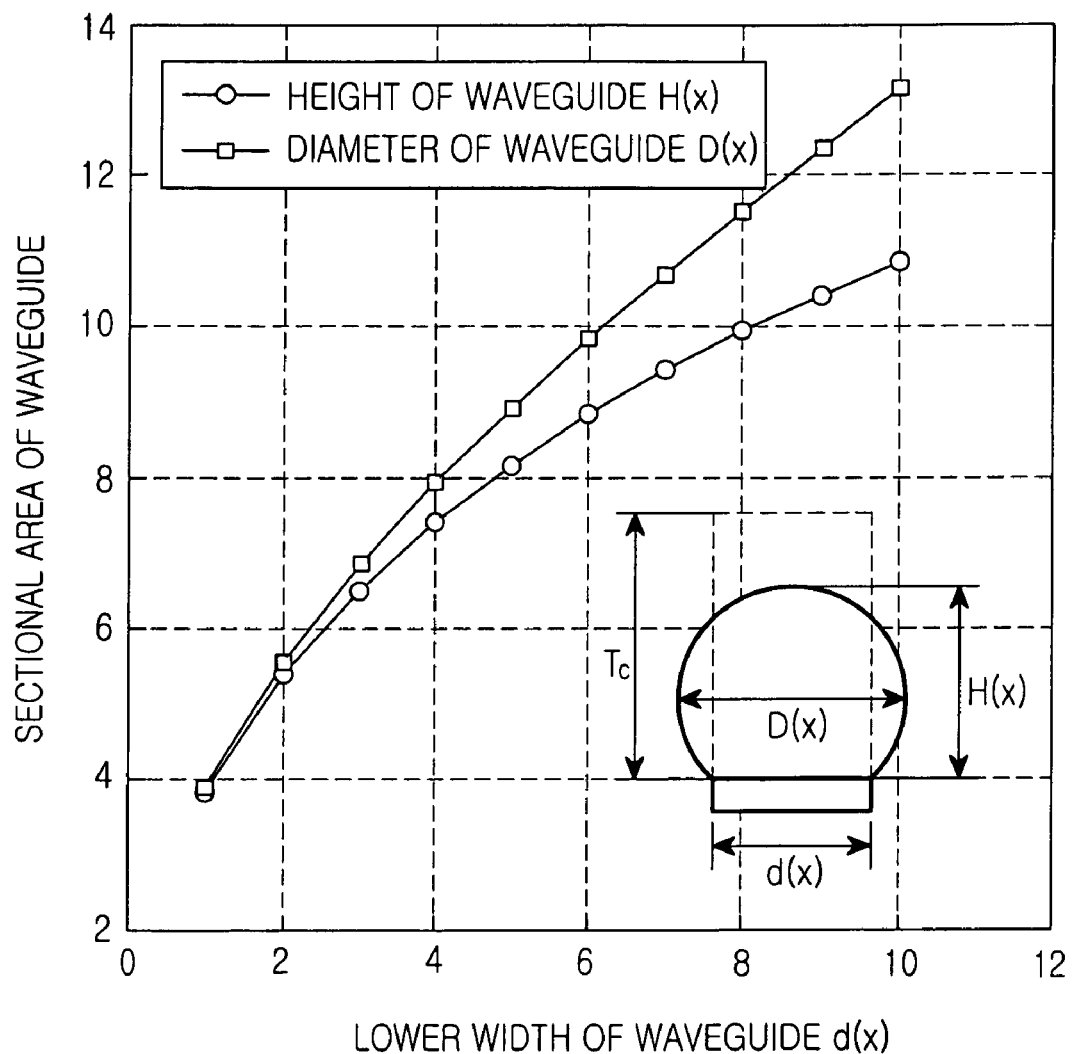
FIG. 12 is a graph illustrating a change of a cross sectional area according to the change of a lower width of a changed optical waveguide.

FIG. 12 is a graph illustrating a change of a cross sectional area according to the change in a lower width of the changed optical waveguide based on results obtained using Equation 3. FIG. 12 shows a height H(x) and diameter D(x) of the changed optical waveguide after the reflowing process when a height $T_c$ of an initial optical waveguide before the reflowing process is constant 12 μm and a lower width d(x) of the initial optical waveguide linearly varies from 1 μm to 10 μm. As shown, a rectangular cross section of the linear-shaped initial optical waveguide with the height of 12 μm and the lower width of 1 μm is changed to a segment of a circle with the height H(x) of 3.85 μm and the diameter D(x) of 3.92 μm, and a rectangular cross section of the linear-shaped initial optical waveguide with the height of 12 μm and the lower width of 10 μm is changed to a segment of a circle with the height H(x) of 10.86 μm and the diameter D(x) of 13.16 μm.

As described above, it is possible to fabricate a tapered optical waveguide having a cross section of a desired size by changing the design of the lower width d(x) of the initial optical waveguide in a general etching process of the initial optical waveguide. In addition, it is possible to design an optical mode converter having the minimum length. Therefore, a PLC using reflow of an optical waveguide according to embodiments of the present invention show many advantages, as described below. Hereinafter, "two-dimensional" means that only a width of the optical waveguide is changed, and "three-dimensional" means that a width and a height of the optical waveguide are changed.

First, according to the embodiments of the present invention, it is possible to fabricate a three-dimensional tapered optical waveguide in which the height and width of the optical waveguide is simultaneously varied through a two-dimensional etching process for fabricating a typical optical waveguide or a mode converter using the same.

Second, unlike a method of fabricating a PLC having a conventional heat-expanded core known as a chip basis process, since the PLC fabricating method according to the embodiments of the present invention is a wafer basis process, the fabricating process is simpler, and reproducibility is higher. Moreover, comparing to a conventional gray scale lithography method, the fabricating process is simpler, and reproducibility is higher. Furthermore, since the fabricating process does not need a gray scale mask, additional expenses are not required.

shape with a constant height and a continuously varying width along a lengthwise direction.

Third, according to the embodiments of the present invention, it is possible to fabricate a mode converter having simple and predictable analysis of a fabricating process and satisfying a non-optical-loss condition, i.e., an adiabatic condition of light, under slit width design of a two-dimensional mask. Accordingly, unlike a prior art in which a length of the mode converter is unnecessary long, the length of the mode converter can be minimized.

Fourth, for most high refractive index optical waveguides including the mode converter, it is known that sidewall roughness in an etching process is a main reason of an optical loss. According to the embodiments of the present invention, since surface roughness of the optical waveguide and mode converter is removed in a heating process, the optical loss in a high refractive index optical waveguide can be reduced.

While the invention has been shown and described with reference to a certain preferred embodiment thereof, it will be understood by those skilled in the art that various changes in form and details may be made therein without departing from the spirit and scope of the invention as defined by the appended claims.

What is claimed is:

1. A method of fabricating a planar lightwave circuit (PLC) having a changed optical waveguide, the method comprising the steps of:
   (b) forming an initial optical waveguide having a predetermined pattern on a substrate; and
   (c) reflowing the optical waveguide by applying heat thereto,
   wherein the initial optical waveguide in the step (b) has a width d(x) and a height $T_c$ along a lengthwise direction, wherein the changed optical waveguide after the step (c) has a radius R(x) along the lengthwise direction, and wherein the initial optical waveguide and the changed optical waveguide have a following correlation:

$$R(x)^2 \left( \pi - \cos^{-1} \left( \frac{\sqrt{R(x)^2 - \frac{d(x)^2}{4}}}{R(x)} \right) \right) + \frac{d(x)\sqrt{R(x)^2 - \frac{d(x)^2}{4}}}{2} - d(x)T_c = 0.$$

2. The method of claim 1, further comprising the step of:
   (a) forming a lower cladding on the substrate,
   wherein in the step (b), the initial optical waveguide is formed on the lower cladding.

3. The method of claim 1, further comprising the step of:
   (d) forming an upper cladding on the changed optical waveguide after the step (c).

4. The method of claim 1, wherein a cross section of the initial optical waveguide has a substantially rectangular shape with a constant width and height along a lengthwise direction.

5. The method of claim 1, wherein a cross section of the initial, optical waveguide has a substantially rectangular 6. The method of claim 1, wherein the optical waveguide is made from silica ($SiO_2$) doped with dopants.

7. The method of claim 6, wherein the dopants are chosen from at least one of $GeO_2$, $P_2O_5$, $B_2O_3$, $TiO_2$ and $Al_2O_3$.

8. The method of claim 1, wherein the initial optical waveguide is formed by a flame hydrolysis deposition (FHD) process.

9. The method of claim 1, wherein the initial optical waveguide is formed by a photolithography process.

10. The method of claim 2, wherein the lower cladding has a lower refractive index than the initial optical waveguide.

11. The method of claim 2, wherein the initial optical waveguide is formed on the lower cladding by photolithographing a core layer using a mask having a predetermined pattern of slits and a photoresist.

12. A planar lightwave circuit (PLC) comprising:
    a substrate; and
    an optical waveguide, which is formed on the substrate, having a predetermined pattern,
    wherein the optical waveguide has a convexly projected shape after being reflown by heat,
    wherein an initial optical waveguide prior to the reflow has a width d(x) and a height $T_c$ along a length direction,
    wherein the optical waveguide having the predetermined pattern obtained by reflowing the initial optical waveguide has a radius R(x) along the length direction, and
    wherein the initial waveguide and the optical waveguide obtained by reflowing the initial optical waveguide has a following correlation $$R(x)^2 \left( \pi - \cos^{-1} \left( \frac{\sqrt{R(x)^2 - \frac{d(x)^2}{4}}}{R(x)} \right) \right) + \frac{d(x)\sqrt{R(x)^2 - \frac{d(x)^2}{4}}}{2} - d(x)T_c = 0$$

13. The PLC of claim 12, further comprising:
    a lower cladding formed between the substrate and the optical waveguide; and
    an upper cladding formed on the optical waveguide.

14. The PLC of claim 12, wherein the optical waveguide is formed by a flame hydrolysis deposition (FHD)) process.

15. The PLC of claim 12, wherein the optical waveguide is formed by a photolithography process.

16. The PLC of claim 13, wherein the lower cladding has a lower refractive index than the optical waveguide.

* * * * *